United States Patent [19]

Böhme-Kovac et al.

[11] Patent Number: 5,387,626

[45] Date of Patent: Feb. 7, 1995

[54] ADDITIVE COMBINATION FOR IMPROVING THE PROCESSING PROPERTIES OF WATER-CONTAINING MIXTURES OF BUILDING MATERIALS

[75] Inventors: Jozef Böhme-Kovac, Dexheim; Friedrich Girg, Idstein/Taunus; Heinz-Josef Mann, Saulheim, all of Germany

[73] Assignee: Hoechst Aktiengesellschaft, Frankfurt am Main, Germany

[21] Appl. No.: 234,730

[22] Filed: Apr. 28, 1994

Related U.S. Application Data

[63] Continuation of Ser. No. 939,009, Sep. 2, 1992, abandoned.

[30] Foreign Application Priority Data

Sep. 3, 1991 [DE] Germany .............................. 4129169

[51] Int. Cl.[6] .......................... C08L 1/28; C08L 3/16
[52] U.S. Cl. ........................................ 524/35; 524/53
[58] Field of Search ...................... 524/35, 53

[56] References Cited

U.S. PATENT DOCUMENTS

| | | | |
|---|---|---|---|
| 3,847,630 | 11/1974 | Compernass et al. .................. 524/5 |
| 4,021,257 | 5/1977 | Bernett . | |
| 4,588,772 | 5/1986 | Böhmer et al. . | |
| 4,687,516 | 8/1987 | Burkhalter et al. .............. 525/54.23 |

FOREIGN PATENT DOCUMENTS

| | | |
|---|---|---|
| 1113513 | 12/1981 | Canada . |
| 0141360 | 5/1985 | European Pat. Off. . |
| 0327351 | 8/1989 | European Pat. Off. . |
| 0375332 | 6/1990 | European Pat. Off. . |
| 1381817 | 11/1964 | France . |
| 2154035 | 5/1973 | France . |
| 1283726 | 11/1968 | Germany . |
| 1646501 | 9/1972 | Germany . |
| 2146709 | 3/1973 | Germany . |
| 2735216 | 3/1978 | Germany . |
| 3339860 | 5/1985 | Germany . |
| 3920025 | 1/1991 | Germany . |
| 1232880 | 5/1971 | United Kingdom . |
| 1340159 | 12/1973 | United Kingdom . |

Primary Examiner—Joseph L. Schofer
Assistant Examiner—Jeffrey T. Smith

[57] ABSTRACT

Additive combination for improving the processing properties of water-containing mixtures of building materials.

The invention relates to an additive combination for water-containing mixtures of building materials, comprising a) at least 65% by weight, preferably 65 to 98% by weight, of a water-soluble cellulose ether or a derivative thereof, b) from 1 to 15% by weight of polyacrylamide, c) from 1 to 20% by weight of an alkali metal salt or ammonium salt of a crosslinked, ungrafted or starch-grafted polyacrylate, d) from 0 to 20% by weight of a starch ether and e) from 0 to 15% by weight of a water-soluble alkali metal salt, alkaline earth metal salt or ammonium salt of an arylsulfonic acid-formaldehyde condensation product or of a sulfonic acid-modified product of the polycondensation of melamine and formaldehyde, and to building material mixtures which contain these additive combinations.

The additive combinations according to the invention are suitable for all water-containing mixtures of building materials, in particular for plasters, mortars, adhesive cements and fillers.

11 Claims, No Drawings

ADDITIVE COMBINATION FOR IMPROVING THE PROCESSING PROPERTIES OF WATER-CONTAINING MIXTURES OF BUILDING MATERIALS

This is a continuation of our copending application Ser. No. 07/939,009, filed Sep. 2, 1992, now abandoned.

In general, water-containing mixtures of building materials are taken to mean plasters, wall mortars, thin-bed adhesive cements and fillers, to which the amount of water necessary for processing and solidification is added either in the production plant or at the building site.

In addition to the principal constituents—such as binders, aggregate and fillers—these mixtures of building materials also contain additives. The most common additives are thickeners, air entrainers, dispersants, thinners, stabilizers and water-repellent agents. Of the thickeners, cellulose ethers have achieved the greatest importance in practice. Cellulose ethers and in particular methylcellulose have a considerable effect on the processing properties of modern building material mixtures.

The use of methylcellulose has made a crucial contribution to the development of modern building material mixtures, such as, for example, thin-bed adhesive cements and machine-applied plasters. Methylcellulose significantly increases the water-retention capacity of the basic mixture of building materials. At the same time, the mortar or adhesive cement is thickened, which results in a significantly better structural stability. Structural stability of building material mixtures means that plaster applied, for example, to a wall does not sag and tiles laid in a bed of adhesive cement do not slip off. In order to further improve this structural stability, cellulose ethers are frequently modified by means of synthetic or natural organic polymers.

Of these polymers employed to modify cellulose ethers, the greatest importance has been achieved by polyacrylamide (PAA) and PAA-modified cellulose ethers (DE-A-1 283 726; DE-A-1 646 501; DE-A-2 146 709 and U.S. Pat. No. 4,021,257). In addition to the addition of polyacrylamide, DE-A-3 339 860 describes, as a further modification variant, the chemical linking of cellulose ethers to polyacrylamides.

The German patent application with the file reference P 41 09 092.6 (Title: Building material products containing organic polymers as thickeners), which was not published before the date of filing of the present application, describes combinations of water-soluble natural polymers or derivatives thereof, such as cellulose ethers, xanthan gums, guar derivatives, starch ethers and carob seed flour, with alkali metal and ammonium salts of crosslinked and possibly additionally starch-grafted polyacrylates and if desired with additives of alkali metal and alkaline earth metal salts of products of the condensation of naphthalenesulfonic acid or phenolsulfonic acid with formaldehyde, or with sulphonic acid-modified products of the polycondensation of melamine and formaldehyde; these combinations can be used as thickeners for increasing the viscosity of building material products.

The user requires water-containing building material mixtures to have good processing properties. An improvement in the processing properties is one of the most important aims in the further development of modern building material mixtures. There are a number of evaluation criteria for assessing the processing properties of building material mixtures.

The processing properties of fillers and tile adhesives can be assessed by means of the following evaluation criteria.

Water factor:

The ratio between the necessary amount of water and the building material dry-mix, i.e. the amount of water (in parts by weight per 100 parts by weight of dry-mix) necessary to give the particular building material mixture a practicable processing consistency. The water factor depends on the type and amount of the binders, the particle fineness and water absorption of the fillers and aggregates, the thickening or plasticizing properties of the additives used, and on the consistency of the building material mixture desired by the processor and matched to the particular applications.

Structural stability:

Tile adhesives have structural stability if tiles and boards laid in the freshly applied adhesive cements do not slide off vertical surfaces (walls). Fillers and grouts have structural stability if they do not sag in holes and joints after the filling operation or, in the case of surface coating, do not slide off vertical surfaces during and after the coating.

Knife application:

Coating procedure using building material mixtures such as fillers and grouts on vertical and horizontal surfaces.

Comb application:

Coating procedure for tile, board and block adhesive cement by means of a comb trowel or comb spatula (with triangular or rectangular teeth) on the respective substrates. This achieves a uniformly thick layer of adhesive cement.

Smoothing and sealing of the surface:

Final treatment procedure for fillers and grouts in order to achieve a smooth surface.

The processing properties of plasters and mortars can be assessed by means of the following evaluation criteria.

Structural stability:

Plasters and mortars have structural stability if they do not sag during application to walls and ceilings and during the subsequent smoothing operation, for example leveling with a leveling lath (plasterer's float), i.e. remain sag resistant.

Leveling:

First smoothing operation, immediately after application of the plaster or mortar to walls and ceilings.

Straightening (shaving):

Second smoothing operation using a levelling lath (plasterer's float) on the plaster or mortar which has already stiffened somewhat. This smoothing operation serves to straighten the plaster surface, which still has an uneven structure.

Slurrying:

After the plaster surface, which has already dried somewhat, has been moistened, for example by spraying with water, it is rubbed with a sponge or felt, during which a liquid/pasty material, the slurry, accumulates at the plaster surface. The extent of slurrying and the consistency of the slurry, for example thin or thick, have a considerable effect on the surface quality of the hardened plaster.

Smoothing:

Final treatment operation with a smoothing trowel in order to achieve the final surface smoothness of the plaster.

In particular, the tendency of water-retaining building material mixtures to stick, caused by the cellulose ethers employed, should be low in the case of gypsum-containing plasters and mortars since it has an adverse effect on the processing properties. It is apparent that, in particular, plasters and mortars having a high tendency to stick are difficult to apply and can only be processed with considerable physical effort.

In particular on the part of the user, there is therefore a desire for water-containing mixtures of building materials which have a reduced tendency to stick and whose processing properties are therefore improved.

Surprisingly, it has now been found that additive combinations of water-soluble cellulose ethers and derivatives thereof, polyacrylamide, alkali metal salts or ammonium salts of crosslinked and possibly additionally starch-grafted polyacrylates, known in the art as superabsorbents (SAPs), if desired starch ethers and if desired additives of alkali metal, alkaline earth metal or ammonium salts of products of the condensation of naphthalenesulfonic acid or phenolsulfonic acid with formaldehyde, or with sulfonic acid-modified products of the polycondensation of melamine and formaldehyde, improve the processing properties of water-containing mixtures of building materials by reducing the tendency to stick of the water-containing mixtures of building materials.

Additive combinations of said water-soluble cellulose ethers and derivatives thereof with polyacrylamide and with the superabsorbents also significantly reduce the tendency to stick compared with the known additive combinations in water-containing building material mixtures.

The invention relates to additive combinations for water-containing mixtures of building materials, containing a) at least 65% by weight, preferably 65 to 98% by weight, of a water-soluble cellulose ether or a derivative thereof,
b) from 1 to 15% by weight of polyacrylamide,
c) from 1 to 20% by weight of an alkali metal salt or ammonium salt of a crosslinked, ungrafted or starch-grafted polyacrylate,
d) from 0 to 20% by weight of a starch ether and
e) from 0 to 15% by weight of a water-soluble alkali metal salt, alkaline earth metal salt or ammonium salt of an arylsulfonic acid-formaldehyde condensation product or of a sulfonic acid-modified product of the polycondensation of melamine and formaldehyde.

The invention furthermore relates to building material mixtures which contain this additive combination.

The additive combinations described are suitable for all water-containing mixtures of building materials, in particular for plasters, mortars, adhesive cements and fillers.

In order to improve the processing properties, these building material mixtures contain a mixture of the abovementioned components a) to e) in the stated composition. These components are described below in greater detail.

a) Water-soluble cellulose ethers and derivatives thereof:

Suitable water-soluble cellulose ethers and derivatives thereof for the additive combination according to the invention are: methylcellulose, methylhydroxyethylcellulose, methylhydroxypropylcellulose, hydroxyethylcellulose and hydrophobically substituted derivatives thereof, hydroxyethylhydroxypropylcellulose and hydrophobically substituted derivatives thereof, carboxymethylcellulose and carboxymethylhydroxyalkylcellulose. Preference is given to hydroxyethyl- and methylhydroxyalkylcellulose ethers.

The viscosity limits of these cellulose ethers are usually from 10 to 500,000 mPa.s, in particular from 50 to 150,000 mPa.s (measured as a 2% strength aqueous solution in distilled water at 20° C. using a Höppler falling-ball viscometer).

The cellulose ethers of greatest practical importance are listed in Table I together with their etherification data. The mean degree of substitution (DS) indicates the mean number of alkyl groups (here methyl, ethyl and propyl) per anhydroglucose unit. The molar degree of substitution (MS) indicates the mean number of hydroxyalkyl terminal groups (here ethyl and propyl) per anhydroglucose unit. In the alkoxyhydroxypropylhydroxyethylcellulose listed in Table I, the alkoxy group contains from 2 to 20 carbon atoms, which may be linked to one another in a straight-chain or branched manner and which make up from 0.05 to 50% by weight, based on the weight of the substituted cellulose ether.

Table II indicates the cellulose ethers mentioned in the experiments and comparative experiments.

TABLE 1

| Water-soluble cellulose ethers and derivatives thereof | | |
|---|---|---|
|  | DS | MS |
| Methylcellulose | 1.4–2.2 |  |
| Methylhydroxyethylcellulose | 1.3–2.0 | 0.05–0.5 |
| Methylhydroxypropylcellulose | 1.3–2.2 | 0.1–1.0 |
| Hydroxyethylcellulose | — | 1.5–3.5 |
| Hydroethylhydroxypropyl-cellulose |  | MS HE: 0.9–1.2 MS HP: 0.6–0.9 |
| Hydroxypropylcellulose | — | 2.0–3.5 |
| Ethylhydroxyethylcellulose | 0.7–1.2 | 0.8–2.7 |
| Carboxymethylcellulose | 0.5–1.5 | — |
| Carboxymethylhydroxyethyl-cellulose | 0.3–0.6 | 0.3–2.3 |
| Alkoxyhydroxypropylhydroxy-ethylcellulose | — | 1.5–3.5 |

TABLE II

|  | Viscosity, measured in 2% strength aqueous solution | Degree of etherification | |
|---|---|---|---|
|  |  | DS | MS |
| Methylhydroxyethylcellulose (1) | 30,000 | 1.5 | 0.12 |
| Methylhydroxyethylcellulose (2) | 15,000 | 1.8 | 0.12 |
| ethylhydroxyethylcellulose (3) | 6,000 | 1.6 | 0.15 | b) Polyacrylamide (PAA)

The polyacrylamides used for the additive combination according to the invention are anionic, cationic and nonionic polyacryamides having a molecular weight (weight average) $M_w$ of from $1 \times 10^6$ to $10 \times 10^6$. The anionic polyacrylamides used are partially hydrolyzed polyacrylamides, copolymers of acrylamide with alkali metal acrylates, vinylsulfonates and 2-acrylamido-2-methylpropanesulfonates. The cationic polyacrylamides used are copolymers of acrylamide with salts or quaternization products of diethylaminoethyl acrylates, dimethylaminoethyl methacrylate, dimethylaminopropylmethacrylamide, dialkylbisallylammonium salts or aminomethylated polyacrylamide. The nonionogenic polyacrylamides used are homopolymers of acrylamide containing small amounts of carboxyl groups formed by uncontrolled hydrolysis.

The polyacrylamides shown in Table III are preferably employed as component b) in the additive combinations according to the invention.

TABLE III

| In additive combination for: | Ionogeneity | Viscosity*) 0.5% strength in 10% NaCl sol. mPa s | Nitrogen content % | Particle fineness <1.0 mm % |
|---|---|---|---|---|
| Gypsum machine-applied plaster (GMP) or | nonionic, weakly anionic | 130 | 18 | 100 |
| Gypsum-lime machine-applied plaster (GLMP) | cationic | 200+) | 15.5 | 100 |
| Cement-lime undercoat plaster (CLP) | anionic | 200 | 0.5 | 100 |
| Tile adhesive (cement-based) (CTA) | anionic | 130 | 8 | 100 |
| Cement filler (CF) | anionic | 150 | 10.5 | 100 |
| Gypsum filler (GF) | anionic | 150 | 10.5 | 100 |

*)Viscosity measurement using a Brookfield rotational viscometer, spindle 1, 10 rpm, 20° C.;
+)Concentration 1% strength in 10% strength NaCl solution c) Superabsorbents (SAPs)

Superabsorbents are lattice structures based on neutralized or partially neutralized polyacrylic acids and are formed by free-radical copolymerization of the monomers with small amounts of certain crosslinking agents. There are essentially two processes for the preparation of a polymeric lattice structure:

1) The polymeric lattice structure is synthesized in one polymerization step, starting with the monomers; certain crosslinking reagents, such as, for example, methylenebisacrylamide, diethylene glycol dialkyl ethers and vinyl compounds, are required for the branching and formation of the lattice structure.

2) A presynthesized, straight-chain or branched polymer is crosslinked.

The preparation process mentioned under 1) is of by far the greatest importance for the preparation of SAPs. The polymerization in preparation process 1) is carried out using polymerization techniques such as, for example, emulsion and gel polymerization. Here, an aqueous solution of the monomer, acrylic acid, is polymerized with small amounts of a crosslinking agent. Water is used as diluent and solvent and helps to avoid the high temperatures which sometimes occur in this exothermic process. The concentration of the monomer in the aqueous solution is usually up to 60% by weight. The amounts of crosslinking agent employed are in the range from 0.05 to 1.5 mol %. Polymerization can be carried out in the reactor or with the aid of the thin-film process.

The superabsorbents prepared by the two methods mentioned may also be grafted with starch. This grafting with starch is carried out during the polymerization and crosslinking procedure in a one-pot process. Here, the starch is digested in water by heating and added as a solution at the beginning of the polymerization process. The starch content, based on the superabsorbent, may be from 3 to 30% by weight. Superabsorbents are capable of absorbing and retaining, even under load, large volumes of aqueous liquids with formation of a stable gel structure. This ability is a prerequisite for successful use in the building materials and adhesives area. The amount of aqueous liquid absorbed is in the range up to 400 to 1000 times the inherent weight. Superabsorbents can only absorb water in the pH range from 4 to 10. The partial neutralization necessary for this operation can be carried out before or after the polymerization. The product formed by the polymerization is a moist gel, which is comminuted by means of a gel cutter and subsequently dried. The crosslinking for the preparation of superabsorbents mostly takes place via covalent bonds between the individual polymer chains and the crosslinking agents used. Suitable crosslinking agents for the formation of covalent bonds are so-called polyfunctional monomers, i.e. crosslinking agents containing a double bond. Typical representatives of these polyfunctional molecules are methylenebisacrylamide, diethylene glycol dialkyl ethers and vinyl compounds such as, for example, vinyl ethers, vinyl esters and vinylphosphonic acids.

Further opportunities for crosslinking via covalent bonds are offered by polyfunctional molecules such as, for example, diepoxides, azirines and polyalcohols. The last-mentioned crosslinking agents are capable of additionally crosslinking polymer chains which are already crosslinked to a small extent. This additional surface crosslinking allows superabsorbents having various degrees of crosslinking to be prepared. This allows combinations of the good absorption properties of sparingly crosslinked superabsorbents with the advantages of highly crosslinked superabsorbents. Sparingly crosslinked superabsorbents have a high absorption capacity for aqueous liquids and large amounts of extractable aqueous liquid but a low absorption ratio as a consequence of gel blocking. The highly crosslinked superabsorbents have no gel blocking and accordingly a better absorption capacity and stability when subjected to pressure.

In order to achieve an optimum crosslinking and lattice structure of the superabsorbents, mixtures of high-reactivity and low-reactivity crosslinking reagents are employed in the preparation process, a corresponding variation in the mixing ratios of the crosslinking components employed allowing the density and nature of the lattice structures to be varied over a broad range and matched to requirements.

Features of the suitable superabsorbents in the additive combination according to the invention are the greatest possible total absorption capacity for demineralized water (>100 g/g) and an absorption capacity under pressure of <50 ml of 0.9% strength NaCl solution per g.

Examples of superabsorbents which are used in the additive combinations according to the invention are shown in Table IV.

d) Starch ethers

The characteristic data of starch ethers used in the additive combinations according to the invention are shown in Table V.

e) Water-soluble condensation products based on arylsulfonic acids and formaldehyde, and alkali metal, ammonium and alkaline earth metal salts thereof.

Suitable water-soluble polycondensation products are:

1. Polycondensation products made from naphthalene-sulfonic acid and formaldehyde, in the form of their alkali metal, ammonium and alkaline earth metal salts;
2. Sulfonic acid-modified polycondensation products made from melamine and formaldehyde, in the form of their alkali metal or ammonium salts.

The characteristic data of the water-soluble condensation products based on arylsulfonic acids and formaldehyde are shown in Table IV

TABLE IV

| | Total absorption capacity in | | Centrifuge retention | Absorption capacity under pressure | |
|---|---|---|---|---|---|
| | demin. $H_2O$ (g/g) | 0.9% str. NaCl soln. (g/g) | 0.9% str. NaCl soln. (g/g) | 0.9% str. NaCl soln. (ml/g) | Extractable content (%) |
| Superabsorbent (1)[2] Sanwet ® IM 1500 | 500 | 50 | 32 | 15 | 7 |
| Superabsorbent (2)[2] Sanwet ® IM 1000 | 1000 | 65 | 42 | 5 | 14 |
| Superabsorbent (3)[1] Sanwet ® IM 5000S | 400 | 48 | 32 | 32 | 3 |

Manufacturer:
[1] Hoechst AG
[2] Hoechst Celanese Corp.

TABLE V

| Starch ether | MS | DS | Viscosity* measured as 2% strength aqueous solution |
|---|---|---|---|
| Hydroxypropyl starch | 0.1–0.8 | — | 5–100 |
| Carboxymethyl starch | — | 0.1–0.8 | 5–500 |
| Hydroxypropylcarboxymethyl starch | 0.1–0.8 | 0.1–0.5 | 5–500 |

*Measurement at 20° C. in distilled water using a Höoppler falling-ball viscometer.

TABLE VI

| Properties | Typical data |
|---|---|
| Napthalenesulfonic acid-formaldehyde condensation product; Na salt: | |
| Supply form | liquid/pulverulent |
| Concentration (active content) | 20–40% strength/70–96% |
| Na sulfate content | 0–25% |
| Molecular weight | 4,000–40,000 |
| pH | 6.5–11 |
| Viscosity (23° C.) | 10–150 mpa·s (liquid products) |
| Melamine-formaldehyde condensation product, sulfonated; Na salt: | |
| Supply form | liquid/pulverulent granules |
| Concentration (active content) | about 20% strength/80–100% |
| Molecular weight | 20,000–30,000 |
| pH | 8–12 |
| Density | liquid products: 1.1 $g/m^3$ solid products: 1.7–1.9 $g/cm^3$ |

The additive combinations according to the invention comprise components a), b), c) and, if desired, d) and e).

Components a) to e) may comprise a single compound or a mixture of more than one compound. Thus, it is conceivable that component a) comprises a cellulose ether or a derivative thereof or a mixture of more than one cellulose ether or derivatives thereof.

The pulverulent or granular components a), b), c) and, if desired, d) and e) may be admixed individually with the building material products or components a), b), c), d) and e) are first mixed with one another and this mixture is then added to the building material products.

Incorporation of these components into the building material products is carried out by conventional stirring and mixing processes.

The sum of components a), b), c), d) and e) of the additive combination in the building material products is from 0.01 to 2% by weight, preferably from 0.02 to 1% by weight, based on the dry weight.

EXAMPLE

In order to be able to verify the advantages of the additive combinations according to the invention compared with conventional additive combinations, numerous experiments have been carried out using mineral building material mixtures. These experiments comprised the preparation, processing and assessment of the processing properties of the mineral building material mixtures.

For the purposes of the experiments, mineral building material mixtures (1) to (6) were employed. Their composition is indicated in parts by weight and is shown in Table VII. The preparation was carried out by simply mixing the constituents in the stated mixing ratios. Both additive combinations according to the invention and conventional additive combinations were added to these building material mixtures (1) to (6).

Each additive combination was prepared by simply mixing the individual components. The composition of the additive combinations C, D, F and G according to the invention, stated in parts by weight, is shown in Table VIII. The composition of the conventional additive combinations A, B and E, stated in parts by weight, is shown in Table IX.

The following substances were used for the additive combinations in the experiments carried out (Tables X and XII):

Experiments 1A and 1C:
methylhydroxyethylcellulose (1) from Table II;
polyacrylamide for gypsum machine-applied plaster from Table III (nonionic);
superabsorbent (3) from Table IV (only 1C)

Experiments 2A and 2C:
methylhydroxyethylcellulose (1) from Table II;
polyacrylamide for gypsum-lime machine-applied plasters from Table III (cationic);
superabsorbent (1) from Table IV (only 2C)

Experiments 3B and 3D:
methylhydroxyethylcellulose (2) from Table II;
polyacrylamide for cement-lime plaster from Table III (anionic);
melamine-formaldehyde—sulfonated—Na salt from Table VI (Melment® F 10, manufacturer: Süddeutsche Kalk-Stickstoff-Werke (SKW), Trostdorf);
superabsorbent (1) from Table IV (only 3D)

Experiments 4E, 4F, 4G, 5E, 5F, 5G, 6E, 6F, 6G:
methylhydroxyethylcellulose (3) from Table II;
hydroxypropyl starch having an MS=0.5 from Table V (not 4G, 5G and 6G);
polyacrylamide for cement fillers and gypsum fillers from Table III, anionic (4E, 4F, 4G, 6E, 6F, 6G);
polyacrylamide for cement-based tile adhesives from Table III, anionic (5E, 5F and 5G);
superabsorbent (3) from Table IV (4F, 4G, 5F, 5G, 6F and 6G)

The air entrainers used were Hostapur®OSB and Genapol®PF80 (manufacturer: Hoechst AG).

The starch ethers employed were commercially available preparations.

Table X shows the composition of the tested building material mixtures 1A, 1C, 2A, 2C, 3D and 3C. Processing was by means of a spray-plastering machine. Table XI shows the result of the spraying experiments. Table XII shows the composition of the tested building material mixtures 4E, 4F, 4G, 5E, 5F, 5G, 6E, 6F and 6G and the evaluation of the processing properties.

Experimental results

Experiments 1C, 2C and 3D, which contain the additive combinations C and D according to the invention, show significantly better results with respect to the evaluation criteria:
structural stability
leveling
straightening
slurrying and
smoothing
compared with the conventional additive combinations 1A, 2A and 3B.

Experiments 4F, 4G, 5F, 5G, 6F and 6G, which contain the additive combinations F and G according to the invention, show significantly better results with respect to the evaluation criteria:
knife application
comb application and
smoothing and sealing of the surface
compared with the conventional additive combinations.

The evaluation criteria were assessed on the basis of a value scale from 1 to 6 which corresponds to the school grade system from 1 (very good) to 6 (unsatisfactory). Levels between the grades from 1 to 6 are indicated by + (plus) or − (minus) after the numbers.

TABLE VII

Composition of the mineral building material mixtures (1) to (6) (100 parts by weight)

(1) Gypsum machine-applied plaster (GMP):
40 parts by weight of gypsum hemihydrate
50 parts by weight of high-fired gypsum,
2 parts by weight of lime hydrate
7.5 parts by weight of limestone sand 0–1 mm
0.5 part by weight of perlites 0–1 mm (2) Gypsum-lime machine-applied plaster (GLMP)
40 parts by weight of gypsum hemihydrate
10 parts by weight of lime hydrate
50 parts by weight of limestone sand 0–1 mm (3) Cement-lime undercoat plaster (CLP):
12 parts by weight of Portland cement
6 parts by weight of lime hydrate
10 parts by weight of limestone powder
72 parts by weight of limestone sand 0.1–1.5 mm (4) Cement filler (CF):
30 parts by weight of Portland cement
3 parts by weight of lime hydrate
10 parts by weight of limestone powder
57 parts by weight of quartz sand 0.05–0.4 mm (5) Tile adhesive (cement-based) (CTA):
40 parts by weight of Portland cement
60 parts by weight of quartz sand 0.05–0.4 mm (6) Gypsum filler (GF):
85 parts by weight of gypsum hemihydrate (alabaster gypsum)
15 parts by weight of limestone powder

TABLE VIII

| Component | C (parts by wt.) | D (parts by wt.) | F (parts by wt.) | G (parts by wt.) |
|---|---|---|---|---|
| Cellulose ether | 88 | 83 | 80 | 88 |
| Starch ether | — | — | 10 | — |
| Polyacrylamide | 6 | 5 | 5 | 5 |
| Superabsorbent | 6 | 5 | 5 | 7 |
| Water-soluble polycondensation product, based on naphthalene-sulfonic acid-formaldehyde alkali metal salt or melamine-formaldehyde - sulfonated - alkali metal salt | — | 7 | — | — |

TABLE IX

| Component | A (parts by wt.) | B (parts by wt.) | E (parts by wt.) |
|---|---|---|---|
| Cellulose ether | 94 | 88 | 80 |
| Starch ether | — | — | 15 |
| Polyacrylamide | 6 | 5 | 5 |
| Water-soluble polycondensation product, based on naphthalene-sulfonic acid-form- | — | 7 | — |

TABLE IX-continued

| Component | A (parts by wt.) | B (parts by wt.) | E (parts by wt.) |
|---|---|---|---|
| aldehyde alkali metal salt or melamine-formaldehyde-sulfonated-alkali metal salt | | | |

TABLE X

| | 1 A parts by weight | 1 C parts by weight | 2 A parts by weight | 2 C parts by weight | 3 B parts by weight | 3 D parts by weight |
|---|---|---|---|---|---|---|
| GMP (1) | 100 | 100 | — | — | — | — |
| GLMP (2) | — | — | 100 | 100 | — | — |
| CTA (3) | — | — | — | — | 100 | 100 |
| Air entrainer (combination of olefinsulfonate and ethylene oxide-propylene oxide block copolymer, Hostanur ® OSB with Genapol ® PF 80 power in the ratio 1:2 | 0.03 | 0.03 | 0.05 | 0.05 | 0.05 | 0.05 |
| Starch ether | 0.03 | 0.03 | 0.03 | 0.03 | 0.02 | 0.02 |
| Additive combination (Tables VIII and IX) | 0.18 | 0.18 | 0.18 | 0.18 | 0.1 | 0.1 |
| Gypsum setting retarder | 0.1 | 0.1 | 0.1 | 0.1 | — | — |
| Water-repellent agent (commercially available) | — | — | — | — | 0.1 | 0.1 |

TABLE XI

Results of spray experiments and plaster machines

| | 1 A parts by weight | 1 C parts by weight | 2 A parts by weight | 2 C parts by weight | 3 B parts by weight | 3 D parts by weight |
|---|---|---|---|---|---|---|
| Water flow rate (l/h) | 720 | 740 | 600 | 620 | 320 | 340 |
| Feed pressure. 10 m hose (bar) | 9.5 | 9.0 | 8.5 | 9.0 | 12.0 | 11.5 |
| Air pore content (% by volume) | 10.0 | 10.5 | 9.5 | 9.5 | 11.0 | 10.5 |
| Fresh mortar density (kg/dm$^3$) | 1.50 | 1.48 | 1.61 | 1.62 | 1.83 | 1.82 |
| Consistency, extent of spreading (mm) | 164 | 165 | 166 | 165 | 161 | 160 |
| Spray pattern | normal | normal | normal | normal | normal | normal |
| Structural stability | 2 | 2 | 2 | 2 | 2 | 2 |
| Leveling (1 min after spray application) | 2— | 2+ | 2— | 2+ | 2 | 2 |
| Straightening (shaving) | 2 | 2+ | 2— | 2+ | 2 | 2+ |
| Slurrying | 2 | 1 | 2 | 1 | none | none |
| Smoothing | 2— | 1 | 2 | 1 | none | none |

TABLE XII

| | 4 E parts by weight | 4 F parts by weight | 4 G parts by weight | 5 E parts by weight | 5 F parts by weight | 5 G parts by weight | 6 E parts by weight | 6 F parts by weight | 6 G parts by weight |
|---|---|---|---|---|---|---|---|---|---|
| CF (4) | 100 | 100 | 100 | — | — | — | — | — | — |
| CTA (5) | — | — | — | 100 | 100 | 100 | — | — | — |
| GF (6) | — | — | — | — | — | — | 100 | 100 | 100 |
| Additive combination from Tab. VIII and IX | 0.4 | 0.4 | 0.4 | 0.5 | 0.5 | 0.5 | 0.6 | 0.6 | 0.6 |
| Water factor | 0.25 | 0.25 | 0.25 | 0.3 | 0.3 | 0.3 | 0.6 | 0.6 | 0.6 |
| Structural stability | normal | normal | normal | normal | normal | normal | normal | normal | normal |
| Knife application | 2 | 1 | 2 | — | — | — | 2 | 1 | 1 |
| Comb application | — | — | 2 | 2+ | 2+ | — | — | — | — |
| Smoothing or sealing of the surface | 2 | 1 | 1 | none | none | none | 2 | 1 | 1 |

We claim:

1. An additive composition suitable for addition to water-containing building materials, comprising:

a) at least 65% by weight of a water-soluble cellulose ether or a derivative thereof, b) from 1 to 15% by weight of polyacrylamide, c) from 1 to 20% by weight of an alkali metal salt or ammonium salt of a crosslinked, ungrafted or starch-grafted polyacrylate having a lattice structure capable of absorbing about 400 to 1000 times its inherent weight of an aqueous liquid having a pH in the range of from 4 to 10, thereby forming a stable gel structure, d) from 0 to 20% by weight of a starch ether and e) from 0 to 15% by weight of a water-soluble alkali metal salt, alkaline earth metal salt or ammonium salt of an arylsulfonic acid-formaldehyde condensation product or of a sulfonic acid-modified product of the polycondensation of melamine and formaldehyde.

2. An additive composition as claimed in claim 1, wherein the water-soluble cellulose ether is methylhydroxyalkylcellulose, hydroxyalkylcellulose and/or alkoxyhydroxyethylhydroxypropylcellulose having a viscosity in the range from 10 to 500,000 mPa.s.

3. An additive composition as claimed in claim 1 wherein the polyacrylamide is an anionic, cationic and/or nonionic polyacrylamide having a molecular weight (weight average) $\overline{M}_w$ of from $1 \times 10^6$ to $10 \times 10^6$.

4. An additive composition as claimed in claim 1, wherein the starch ether is hydroxypropyl starch, carboxymethyl starch and/or hydroxypropylcarboxymethyl starch.

5. A plural-component building material which can be combined with an aqueous liquid and solidified, said building material containing, as one of its components, an additive composition as claimed in claim 1.

6. A building material as claimed in claim 5, containing from 0.01 to 2% by weight, based on the dry weight, of the additive combination.

7. A building material as claimed in claim 5, wherein said material comprises cement tile adhesives, fillers or plasters.

8. An additive composition as claimed in claim 2, wherein the polyacrylamide is an anionic, cationic or nonionic polyacrylamide or a combination of said polyacrylamides having a weight average molecular weight $\overline{M}_w$ of from $1 \times 10^6$ to $10 \times 10^6$.

9. An additive composition as claimed in claim 2, wherein said viscosity is in the range from 50 to 150,000 mPa.s.

10. An additive composition as claimed in claim 1, wherein the proportion of component a), said water-soluble cellulose ether component, is 65 to 98% by weight.

11. A building material as claimed in claim 5, wherein said material contains from 0.02 to 1% by weight, based on the dry weight, of the additive composition.

* * * * *